United States Patent

Eron

[15] 3,653,641
[45] Apr. 4, 1972

[54] AERATOR AND WATER TREATMENT DEVICE

[72] Inventor: Robert E. Eron, 3375 34th N., St. Petersburg, Fla. 33713

[22] Filed: Oct. 16, 1970

[21] Appl. No.: 81,209

[52] U.S. Cl..................................261/18, 210/242, 261/88, 261/120
[51] Int. Cl. ..........................................B01f 3/04
[58] Field of Search ..................210/242; 261/18, 88, 91, 120

[56] References Cited

UNITED STATES PATENTS 3,521,864  7/1970  Welles, Jr. .............................210/242

*Primary Examiner*—Tim R. Miles
*Assistant Examiner*—Steven H. Markowitz
*Attorney*—Stefan M. Stein

[57] ABSTRACT

A floating liquid aerator and water treatment device adapted for use in aerating and chemical treatment of polluted water. The device includes an axial flow impeller rotated by motor means disposed above a centrally located tube. The motor and impeller, pump water upwardly through the tube and sling it outwardly for interface contact with the particular surrounding atmosphere. The impeller slings the water into the atmosphere with considerable turbulence thereby exposing more of the water surface to the atmosphere, resulting in a higher transfer of oxygen or other gas to the water. The base of the floating aerator includes an extended tube which communicates between the interior of the floating liquid aerator and a point beneath the float near or just above the floor of the body of water. As the aerated or treated water head builds up within the float, the aerated or treated water is forced down the tube thereby causing a gentle flow of aerated or treated water outward and upward near the bottom of the body of water. In addition, means are provided to chemically treat the aerated water whereby the chemicals will be thoroughly dispersed and diluted before being exposed to the environment.

14 Claims, 2 Drawing Figures

PATENTED APR 4 1972

3,653,641

INVENTOR.
ROBERT E. ERON

BY
Law Offices of
Stefan M. Stein
ATTORNEY.

3,653,641

AERATOR AND WATER TREATMENT DEVICE

BACKGROUND OF THE INVENTION

This invention relates to liquid aerators and water treatment devices of the type which are used to prevent water stagnation, to enrich the oxygen content of water, to scrub waste from water, to cool water for recirculation, or to add chemicals such as chlorine, bactericides, herbicides, etcs., to a body of liquid. Such devices usually comprise a multi-bladed axial flow impeller power rotated by a motor and operable to pump water upward through an intake tube. At the upper end of the tube, the water is deflected outwardly for interface contact with the surrounding air prior to falling back onto the surface of the body of water.

SUMMARY OF THE INVENTION

The present invention aims primarily to provide a new and improved aerator and water treatment device of the above type which, when compared to prior devices of the same general character, produces better transfer of oxygen and/or other chemicals to the pond water in that the aerated water is introduced at the bottom of the pond, thereby inducing an outward and upward flow of treated water at the pond base. More specifically, the invention contemplates the provision of a rotatable impeller located at the upper end of an intake tube to sling water outwardly from the tube with considerable turbulence, thereby increasing the interfacial exposure of the water to the particular surrounding atmosphere within the device.

Still another aim of the invention is to utilize the interior of the floating liquid aerator to build up a pressure head of treated water and allowing this pressure differential to force the water down to the bottom of the body of water.

A further object of the invention is to provide an aerating and treating apparatus for use in sewage and industrial waste treatment systems and more particularly to floating water treatment devices wherein a submerged motor-pump is utilized together with a water impeller to aerate and deposit the ambient water within the floating treating apparatus.

A still further object of the invention is to provide an aeration and treating system wherein it is possible to obtain extended aeration and treatment of waste materials which are consumed by bacteria or oxygen and to obtain cooling of the liquid by convection and evaporation. By this procedure, also, sufficient oxygen or other chemicals are supplied to the water which in turn sustains bacteriological feeding on waste materials in the pond.

Another object of the invention is to provide a device which allows concentrated chemicals such as chlorine or a bactericide to be thoroughly diluted prior to being introduced into the body of water, thereby insuring that the surrounding ecology is not unbalanced.

Still another object is to provide a device whereby a gas may be added to a liquid while not allowing the gas to escape to the atmosphere thereby wasting the gas and adding to the pollution of the air.

The invention, in particular, resides in a novel apparatus to place the treated water flow at or near the bottom of the pond as opposed to the prior art systems of allowing the treated water to flow at the surface of the pond.

The invention accordingly comprises the features of construction, combination of elements, and arrangement of parts which will be exemplified in the construction hereinafter set forth, and the scope of the invention will be indicated in the claims.

Other objects and advantages of the invention will become apparent from the following detailed description taken in connection with the accompanying drawings.

DETAILED DESCRIPTION OF THE PREFERRED EMBODIMENTS

Figure 1:
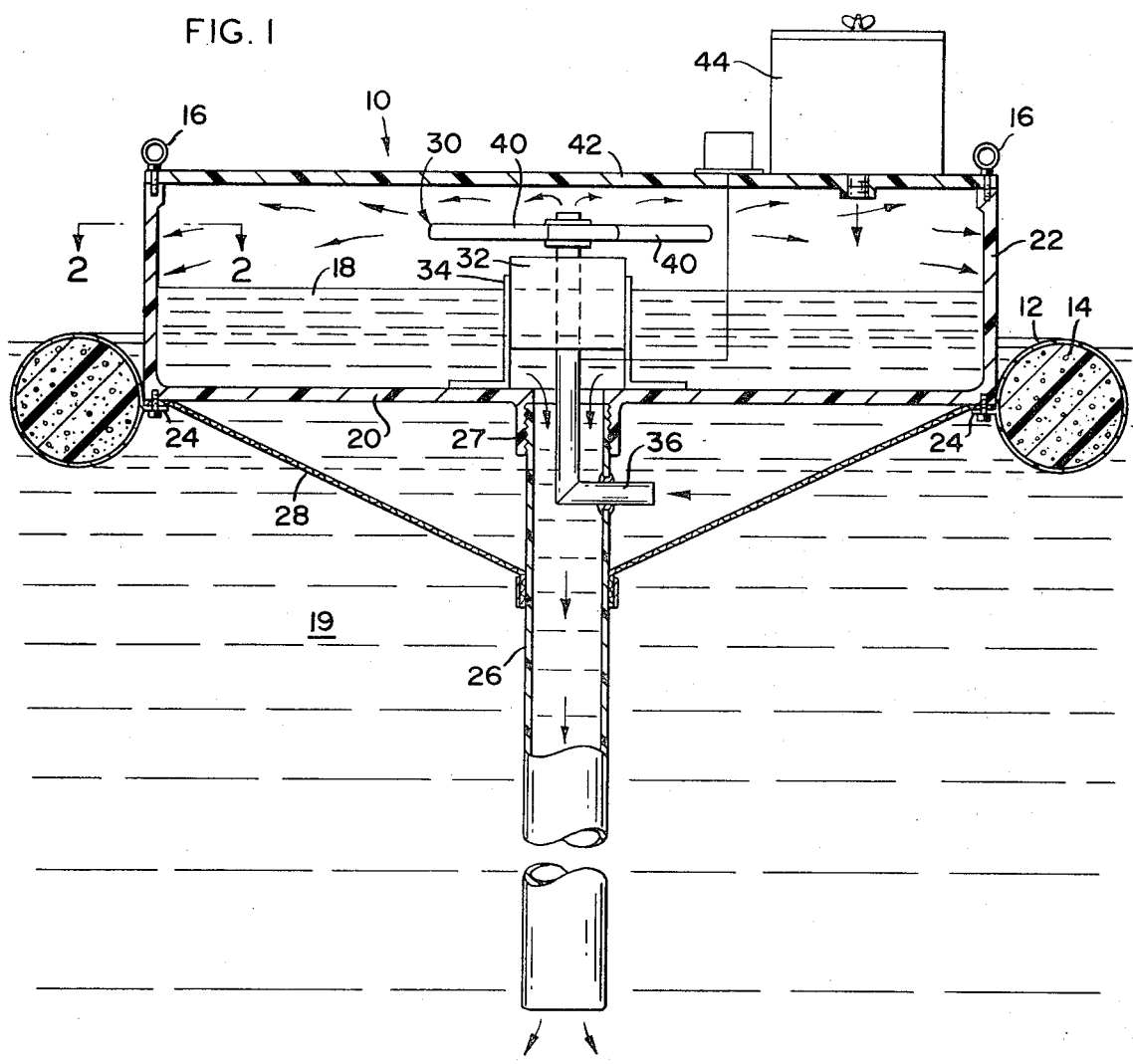
FIG. 1 is a cross sectional view of an aerator and water treatment device embodying the new and improved features of the invention.
Figure 2:
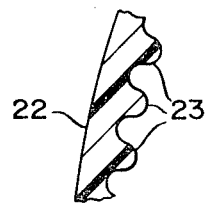
FIG. 2 is a top view of the invention taken through line 2—2 of FIG. 1.
Figure 2:
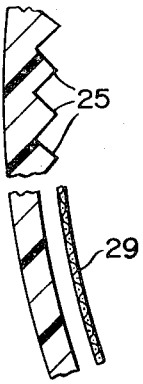

In the drawings, the invention is shown for purposes of illustration incorporated in aeration and water treatment device 10 floating on a body of ambient liquid 19 such as the water in a cooling tank, a pond or a waste treatment pool. Aerator and water treater 10 is supported at the top surface of the water by a float 12 which may be of any generalized type. Here, float 12 is shown filled with polyurethane foam 14. To moor aerator 10 in a given location, a cable (not shown) may be attached to hooks 16 which are placed about the periphery of aerator 10. Float 12, here shown to be generally toroidal in shape, is attached by any conventional means at the base of aerator and water treater 10 so as to allow aerator 10 to float even when the level of treated water 18 is substantially higher than the level of the ambient water 19.

Aerator 10 comprises a generally circular base 20 to which float 12 is fixedly attached. About the periphery of base 20 is an upwardly extending side wall 22. Side wall 22 is fixed to the periphery of base 20 by a plurality of clamps 24 such that there is a substantially liquid tight seal. The center of circular base 20 has a downwardly extending annular flange 27 threadedly attached to communicating means such as a tube 26 and arranged such that aerated water 18 will flow down through tube 26 when the water level within flange 27 is higher than the outside water level. Base 20, side wall 22 and tube 26 define the aerated water retaining means which prevents the mixing of aerated water 18 with ambient water 19. In addition, a generally conical screen 28 may be provided which is connected to the periphery of base 20 and to tube 26 and used to screen out particular matter. Ambient water 18 is drawn into aerator 10 by the intake pumping action of motor 32 and is slung out horizontally by suitable spraying means such as rotating impeller 30. Motor 32 is centrally located on and supported by motor mounts 34 to base 20. The ambient water 19 enters through a right angle cylindrical tube 36 which is disposed within and is fixedly attached through the side wall of tube 26. The tubes may be aerated water retaining means made of polyethylene or any other suitably rigid, corrosion resistant material. The water is slung horizontally outward by rotating impeller 30, as shown in FIG. 1, thereby forming water droplets which increase aeration.

The interior of side wall 22 may be relatively smooth as shown in FIG. 1 or it may be provided with a number of various surface configurations such as corrugated wall 23, sharpened triangle and crest shaped wall 25 or even a screen mesh 29 which is held in a spaced relation to side wall 22 by suitable brackets (not shown). These irregular surfaces further increase the turbulence and interface contact of the droplets and the atmosphere within the device.

In accordance with the present invention, therefore, increased efficiency of pumping and increased oxygen and other chemical absorption are achieved with a low cost construction, floating aerator. Increased oxygen absorption is also accomplished by increasing water turbulence in the air by impinging water against the interior of side wall 22. Also, in accordance with the invention, the motor 32 is submersible and the impeller is hydrodynamically balanced. In carrying out this hydrodynamic balancing, the impeller is formed symmetrically about the axis of the shaft and each of the impeller blades 40 is profiled in a precisely identical manner, not only to afford a constant volume flow of water across the length of each individual blade, but also to cause each blade to pump the same volume of water as every other blade. It has been found that increased pumping efficiency is achieved by this type blade construction.

As impeller 30 rotates, the water particles are slung outwardly causing molecular disturbance whereby noxious gases in the water are released and replaced by oxygen from the air.

The impinging of the water particles on the interior of side wall 22 may be considered as a shearing action which produces high molecular turbulence and agitation, thereby increasing the rate of transfer of gases. Also, any solid particles impinging on the interior of side wall 22 are given a scrubbing action of increased magnitude as compared with the prior art which teaches impingement against the water surface itself.

The length of trajectory of the water in the air from impeller 30 to side wall 22 is important when the aerator is used for cooling towers or the like in which transfer of heat from the water to the air is of primary importance. By increasing the length of the path of the water through the air, more air-water interface contact is obtained over a longer period of time, thereby enabling increased transfer of heat from the water particles. If the invention is used in a cooling tank or tower (not shown) where large quantities of water must be cooled in a relatively limited space, a plurality of spaced aerators 10 may be floated in the body of water.

When it is desired to place a chemical or a gas into the body of water a top 42 may be attached to the top periphery of wall 22 in order to prevent evaporation or pollution of the surrounding air.

In addition, it is contemplated that a foam generator generally shown at 44 or some other means of chemical dispensing be utilized to place chemicals or the like into the surrounding water without a great deal of evaporation. There is an additional advantage that if a strong, concentrated chemical is placed in water treator 10, there is no chance for the chemicals to pollute the atmosphere or to burn the surrounding plants and fish before it is sufficiently diluted.

To aid in the understanding of the invention, a brief description of the operation of the aerator is given hereafter. The submersible motor 32, here, electric, is connected by suitable cable (not shown) to a source of electricity (not shown) and float 12 is disposed in a body of liquid such as a stagnant pond. With the motor operating, the impeller shaft (not shown) is driven to turn impeller 30 and pump water upwardly through cylindrical intake tube 36. It has been found that a rated motor of between one-quarter and one-half horsepower will enable 50–100 gallons per minute to be pumped and slung horizontally from impeller 30. The slinging action of impeller 30 causes turbulence and interaction with the surrounding atmosphere within the device to release gases trapped in the water which are exchanged for oxygen or other chemical atmosphere in the device. As the level of the treated water 18 rises above that of the ambient water 19, a flow is caused downwardly through tube 26 to the bottom of the body of water, as indicated by the arrows in FIG. 1. The rate of flow of such treated water 18 is a function of the gallon per minute input rate of motor 32 and the diameter of tube 26.

The particular configuration of aerator and water treator 10, that is, circular, rectangular or otherwise, the particular type of pumping motor means such as electric or gasoline and the particular configuration of impeller 30 is a matter of choice which is governed by the prior art impellers, motors and aerator-treater configurations. The invention herein resides in the concept of utilizing the pressure head of the aerated-treated water 18 to force a continuous and smooth flow of oxygenated or chemically treated water to a point near the bottom of the body of water in which aerator 10 floats in order that an outward and upward flushing action will take place. The rate of this convection current of treated water can be varied as needed by either varying the diameter of tube 26 or the input rate of motor 32 and, if desired, a gentle flow may be set up which will not disturb life at the bottom of the pond. The device of this construction allows for a more efficient entry of oxygenated or treated water into a body of water in addition to allowing for increased efficiency in cooling, scrubbing, oxygen transfer, release of noxious gases, addition of other treatment chemicals such as chlorine, ozone, bacteriacides, acids, alkalines and others.

In addition, it is contemplated that the device be covered in order that the device may be filled with foamed or gaseous chemicals such that transferring of these chemicals to the sprayed water be facilitated.

It is further contemplated that means be provided to add liquid chemicals to the intake section of the pump whereby these chemicals be sprayed along with the ambient water thereby precluding a concentration of the chemicals from flowing out into the surrounding environment.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described:

What is claimed is:

1. In a liquid aerator and water treatment device, the combination of a support capable of floating, said support having treated water retaining means whereby said treated water is prevented from mixing with the ambient water, communicating means fixedly attached to the base of said support whereby said treated water is introduced into said ambient water at a remote location from said support, intake and spraying means operatively attached to said treated water retaining means whereby ambient water is brought into said support and sprayed through the air into said treated water retaining means thereby obtaining intimate surface contact, aeration and treatment between the particles of water and air or chemicals.

2. A liquid aerator and water treatment device as defined by claim 1 in which said treated water retaining means comprises a flat base portion having an aperture arranged to receive said communicating means, the periphery of said base having an upwardly extending side wall whereby said base, side wall and communicating means thereby define said treated water retainer.

3. A liquid aerator and water treatment device as defined by claim 2 in which said side wall, said base and said communicating means are conjoined in a substantially liquid tight relationship.

4. A liquid aerator and water treatment device as defined by claim 3 wherein said base is substantially circular and wherein said side wall is upwardly extending and conjoined to the periphery of said base.

5. A liquid aerator and water treatment device as defined by claim 1 wherein said communicating means comprise a tube attached to said base in a sealing relationship and extending downwardly from said base and arranged so as to transport said aerated or treated water to said remote location.

6. A liquid aerator and water treatment device as defined by claim 2 wherein said flat base portion is provided with additional float means arranged so as to insure said support remains floating.

7. A liquid aerator and water treatment device as defined by claim 1 wherein said intake and spraying means comprise an intake tube operatively connected with motor means arranged to rotate spray means whereby ambient water is drawn from outside said support and sprayed in a substantially horizontal plane symmetrically about said rotating spray means.

8. A liquid aerator and water treatment device as defined by claim 7 having screening means affixed to said base whereby particulate matter is prevented from entering said intake tube.

9. A liquid aerator and water treatment device of claim 4 wherein cover means are provided whereby said water is prevented from being sprayed outside said treated water retaining means.

10. A liquid aerator and water treatment device of claim 1 having means to introduce substances such as solids, liquids, foams or gases into said treated water retaining means.

11. A liquid aerator and water treatment device as defined by claim 4 wherein the interior of said side wall is irregular thereby causing severe turbulence of said impinging water.

12. A liquid aerator and water treatment device as defined by claim 4 whereby said irregularities are rounded corrugations.

13. A liquid aerator and water treatment device as defined by claim 4 wherein screen mesh means are fixedly held in at a spaced relation between said impeller and said side wall.

14. A liquid aerator and water treatment device as defined by claim 9 wherein chemical introduction means are provided whereby chemicals are introduced directly into said intake tube wherein said chemicals are sprayed outwardly.

* * * * *